(12) United States Patent
Ogata et al.

(10) Patent No.: US 7,143,602 B2
(45) Date of Patent: Dec. 5, 2006

(54) EJECTOR-TYPE DEPRESSURIZER FOR VAPOR COMPRESSION REFRIGERATION SYSTEM

(75) Inventors: Gota Ogata, Kariya (JP); Hirotsugu Takeuchi, Nagoya (JP)

(73) Assignee: Denso Corporation, Kariya (JP)

( * ) Notice: Subject to any disclaimer, the term of this patent is extended or adjusted under 35 U.S.C. 154(b) by 29 days.

(21) Appl. No.: 11/110,605

(22) Filed: Apr. 20, 2005

(65) Prior Publication Data

US 2005/0183448 A1 Aug. 25, 2005

Related U.S. Application Data

(62) Division of application No. 10/437,794, filed on May 14, 2003, now Pat. No. 6,904,769.

(30) Foreign Application Priority Data

May 15, 2002 (JP) .............................. 2002-140621

(51) Int. Cl.
*F25B 1/06* (2006.01)
(52) U.S. Cl. ............................ 62/500; 62/503; 62/512; 62/528
(58) Field of Classification Search .................. 62/500, 62/512, 527, 528, 191; 417/168, 187, 198
See application file for complete search history.

(56) References Cited

U.S. PATENT DOCUMENTS

| | | | | |
|---|---|---|---|---|
| 3,670,519 A | * | 6/1972 | Newton | 62/191 |
| 3,782,131 A | | 1/1974 | Merryfull | |
| 3,922,877 A | * | 12/1975 | Ophir et al. | 62/500 |
| 4,187,695 A | * | 2/1980 | Schumacher | 62/503 |
| 4,192,148 A | * | 3/1980 | Spreter von Kreudenstein | 62/500 |
| 4,301,662 A | * | 11/1981 | Whitnah | 62/500 |
| 4,595,344 A | | 6/1986 | Briley | |
| 5,239,837 A | * | 8/1993 | Kowalski et al. | 62/500 |
| 5,309,736 A | | 5/1994 | Kowalski et al. | |
| 5,343,711 A | | 9/1994 | Kornhauser et al. | |
| 5,347,823 A | | 9/1994 | Alsenz | |
| 5,647,221 A | * | 7/1997 | Garris, Jr. | 62/500 |

(Continued)

FOREIGN PATENT DOCUMENTS

CN 1332344 1/2002

(Continued)

*Primary Examiner*—Mohammad M. Ali
(74) *Attorney, Agent, or Firm*—Harness, Dickey & Pierce, PLC

(57) ABSTRACT

In an ejector-type depressurizer, a nozzle arrangement converts pressure energy of refrigerant supplied from a radiator into velocity energy to depressurize and expand the refrigerant, and a pressurizer arrangement mixes the refrigerant discharged from the nozzle arrangement with the refrigerant drawn from an evaporator and converts the velocity energy of the refrigerant discharged from the nozzle arrangement into pressure energy to increase the pressure of the mixed refrigerant discharged from the pressurizer arrangement. The pressurizer arrangement includes a refrigerant passage that conducts the refrigerant supplied from the nozzle arrangement and the refrigerant supplied from the evaporator, and the refrigerant passage includes a refrigerant passing zone, through which the refrigerant from the nozzle arrangement and the refrigerant from the evaporator mainly pass during operation of the ejector-type depressurizer. A cross sectional size of the refrigerant passing zone of the refrigerant passage is variable.

19 Claims, 9 Drawing Sheets

U.S. PATENT DOCUMENTS

| | | |
|---|---|---|
| 6,138,456 A | 10/2000 | Garris |
| 6,360,552 B1 | 3/2002 | Lee et al. |
| 6,438,993 B1 | 8/2002 | Takeuchi et al. |
| 6,477,857 B1 | 11/2002 | Takeuchi et al. |
| 6,550,265 B1 * | 4/2003 | Takeuchi et al. ........... 62/324.2 |
| 6,701,715 B1 | 3/2004 | Anderson et al. |
| 2002/0022172 A1 | 2/2002 | Sahoda et al. |
| 2002/0106547 A1 | 8/2002 | Sugawara et al. |

FOREIGN PATENT DOCUMENTS

| | | | |
|---|---|---|---|
| JP | 402252603 A | | 10/1990 |
| JP | 404276200 A | | 10/1992 |
| JP | 5-312421 | | 11/1993 |
| JP | 408338398 A | | 12/1996 |
| JP | 10-205898 | * | 8/1998 |
| JP | 11-170850 | | 6/1999 |

* cited by examiner

COMPRESSIVE FORCE

TENSILE FORCE

FIG. 12
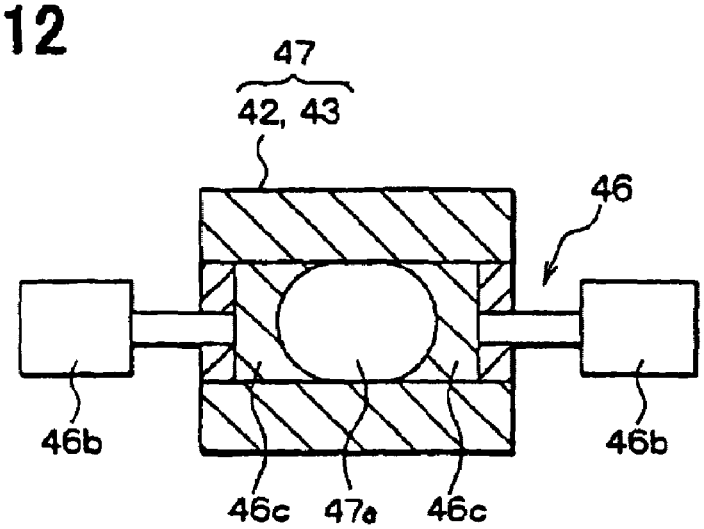
FIG. 13A    FIG. 13B    FIG. 13C
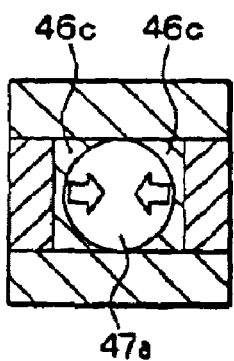 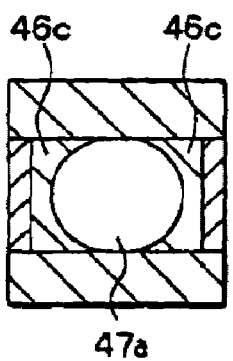 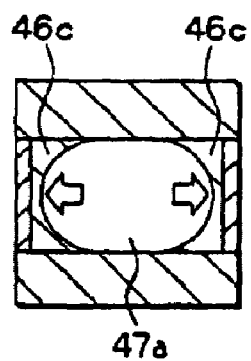
FIG. 14A    FIG. 14B    FIG. 14C
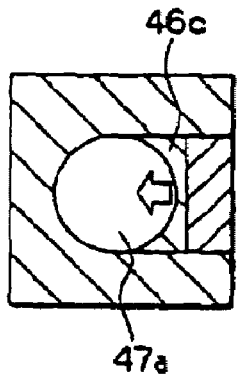 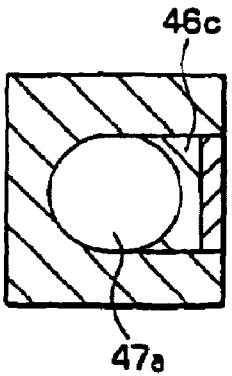 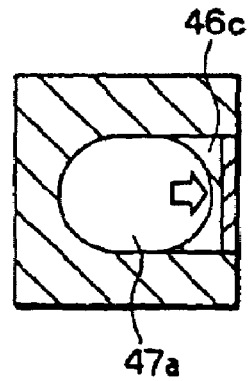

EJECTOR-TYPE DEPRESSURIZER FOR VAPOR COMPRESSION REFRIGERATION SYSTEM

CROSS-REFERENCE TO RELATED APPLICATIONS

This application is a divisional of U.S. patent application Ser. No. 10/437,794 filed on May 14, 2003 now U.S. Pat. No. 6,904,769. This application is based on and incorporates herein by reference Japanese Patent Application No. 2002-140621 filed on May 15, 2002.

BACKGROUND OF THE INVENTION

1. Field of the Invention

The present invention relates to an ejector-type depressurizer for a vapor compression refrigeration system, i.e., an ejector for an ejector cycle.

2. Description of Related Art

As is known in the art, an ejector for an ejector cycle is a kinetic pump which includes a nozzle arrangement and a pressurizer arrangement (see JIS Z8126 Number 2.1.2.3). The nozzle arrangement depressurizes and expands refrigerant to generate high velocity refrigerant flow. In the mixer arrangement, the high velocity refrigerant, which is discharged from the nozzle arrangement, entrains and draws refrigerant from an evaporator, so that the drawn refrigerant (drawn flow) and the discharged refrigerant (drive flow) are mixed, and velocity energy of the discharged refrigerant is converted into pressure energy to increase the pressure of the mixed refrigerant discharged from the mixer arrangement.

That is, in the ejector cycle, expansion energy of the refrigerant is converted into pressure energy to increase the intake pressure of a compressor of the ejector cycle. In this way, the power consumption of the compressor is reduced. However, when the energy conversion efficiency of the ejector, i.e., the ejector efficiency becomes relatively low, the intake pressure of the compressor cannot be sufficiently increased by the ejector, so that the power consumption of the compressor cannot be sufficiently reduced.

At this time, when a flow rate of the refrigerant passing through the refrigerant passage of the pressurizer arrangement is excessively large with respect to the passage cross sectional size (or area) of the refrigerant passage in the pressurizer arrangement, pressure loss induced by friction between the refrigerant and a tube wall of the refrigerant passage is increased, and thus the ejector efficiency is reduced. On the other hand, when the flow rate of the refrigerant in the pressurizer arrangement becomes excessively small with respect to the passage cross sectional size of the refrigerant passage, the entire refrigerant pressure is converted into velocity head (velocity energy), and thus pressure head (pressure energy) becomes small. As a result, the ejector efficiency is reduced.

SUMMARY OF THE INVENTION

The present invention addresses the above disadvantage. Thus, it is an objective of the present invention to provide an ejector-type depressurizer for a vapor compression refrigeration system capable of maintaining relatively high ejector efficiency regardless of a flow rate of refrigerant passing through a pressurizer arrangement of the ejector-type depressurizer.

To achieve the objective of the present invention, there is provided an ejector-type depressurizer for a vapor compression refrigeration system. The vapor compression refrigeration system includes a compressor that compresses refrigerant, a radiator that cools the refrigerant compressed by the compressor, and an evaporator that vaporizes refrigerant. The ejector-type depressurizer includes a nozzle arrangement, a pressurizer arrangement and a refrigerant passing zone varying means. The nozzle arrangement converts pressure energy of the refrigerant supplied from the radiator into velocity energy to depressurize and expand the refrigerant. The pressurizer arrangement mixes the refrigerant discharged from the nozzle arrangement with the refrigerant drawn from the evaporator and converts the velocity energy of the refrigerant discharged from the nozzle arrangement into pressure energy to increase the pressure of the mixed refrigerant discharged from the pressurizer arrangement. The pressurizer arrangement includes a refrigerant passage that conducts the refrigerant supplied from the nozzle arrangement and the refrigerant supplied from the evaporator. The refrigerant passing zone varying means is for varying a cross sectional size of a variable refrigerant passing zone of the refrigerant passage, through which the refrigerant from the nozzle arrangement and the refrigerant from the evaporator mainly pass in the pressurizer arrangement during operation of the ejector-type depressurizer.

BRIEF DESCRIPTION OF THE DRAWINGS

The invention, together with additional objectives, features and advantages thereof, will be best understood from the following description, the appended claims and the accompanying drawings in which:

FIG. 12 is a schematic view showing an ejector according to a seventh embodiment;

FIG. 13A is a schematic view showing one operational state of the ejector of the seventh embodiment;

FIG. 13B is a schematic view showing another operational state of the ejector of the seventh embodiment;

FIG. 13C is a schematic view showing a further operational state of the ejector of the seventh embodiment;

FIG. 14A is a schematic view showing one operational state of an ejector according to an eighth embodiment;

FIG. 14B is a schematic view showing another operational state of the ejector of the eighth embodiment;

FIG. 14C is a schematic view showing a further operational state of the ejector of the eighth embodiment;

DETAILED DESCRIPTION OF THE INVENTION (First Embodiment)

Figure 1:
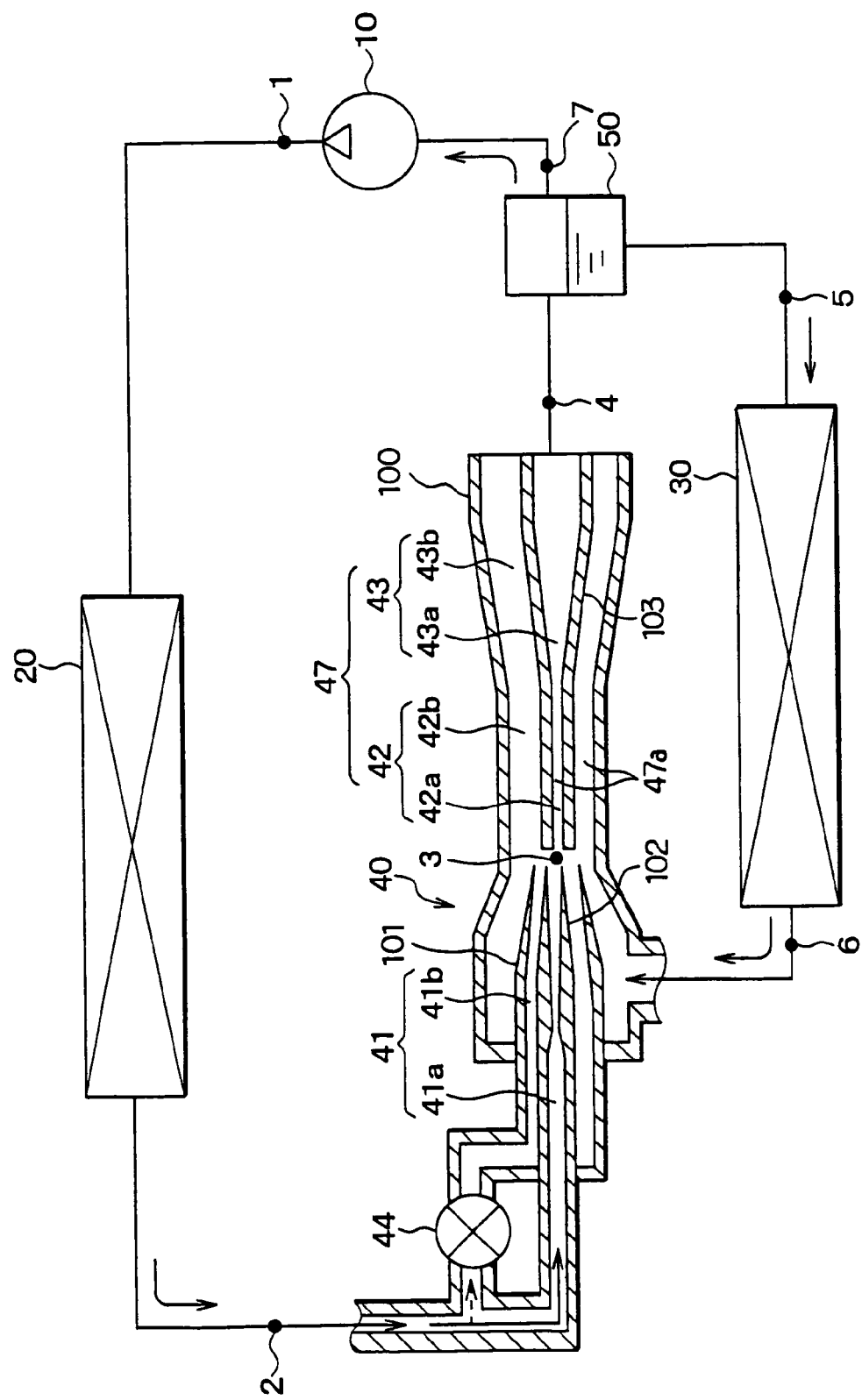
FIG. 1 is a schematic view of an ejector cycle according to a first embodiment of the present invention.

In a first embodiment of the present invention, an ejector-type depressurizer, i.e., an ejector for an ejector cycle of the present invention is embodied in a vehicle air conditioning system. FIG. 1 schematically shows an ejector cycle according to the first embodiment.

With reference to FIG. 1, a compressor 10 is a variable displacement compressor of a known type, which is powered by a drive engine of a vehicle to draw and compress refrigerant. Alternatively, the compressor 10 can be an electric compressor driven by an electric motor. A radiator 20 is a high pressure side heat exchanger. In the radiator 20, heat is exchanged between the refrigerant discharged from the compressor 10 and outside air located outside a passenger compartment of the vehicle to cool the refrigerant.

In the first embodiment, chlorofluorocarbon is used as the refrigerant, so that refrigerant pressure in the radiator 20 is normally kept equal to or less than the critical pressure of the refrigerant, and refrigerant condenses in the radiator 20.

An evaporator 30 is a low-pressure side heat exchanger. In the evaporator 30, heat is exchanged between the liquid phase refrigerant and the air to be discharged into the passenger compartment, so that the liquid phase refrigerant is vaporized or evaporated to cool the air to be discharged into the passenger compartment. An ejector 40 depressurizes and expands the refrigerant supplied from the radiator 20 to draw the vapor phase refrigerant, which has been vaporized in the evaporator 30. Also, the ejector 40 converts expansion energy of the refrigerant into pressure energy of the refrigerant to increase the intake pressure of the compressor 10. Details of the ejector 40 will be described later.

The refrigerant discharged from the ejector 40 is supplied to a gas-liquid separator 50. The gas-liquid separator 50 serves as a gas-liquid separating means for separating and storing the refrigerant in two phases, i.e., the vapor phase refrigerant and the liquid phase refrigerant. A vapor phase refrigerant outlet of the gas-liquid separator 50 is connected to an inlet of the compressor 10, and a liquid phase refrigerant outlet of the gas-liquid separator 50 is connected to an inlet of the evaporator 30.

The ejector 40 will be described in greater detail.

Figure 2:
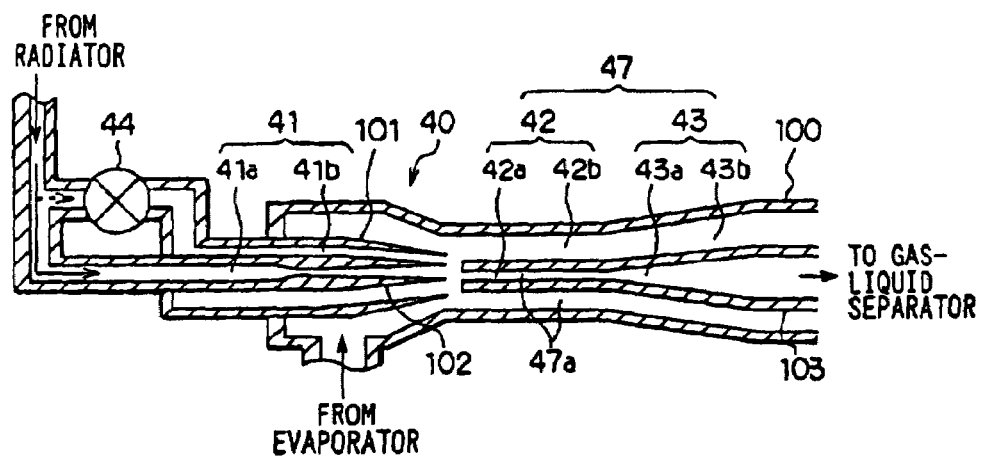
FIG. 2 is a schematic view of an ejector of the ejector cycle according to the first embodiment.

With reference to FIG. 2, the ejector 40 includes a nozzle arrangement 41, a mixer arrangement 42 and a diffuser arrangement 43. The nozzle arrangement 41 converts the pressure energy of the high pressure refrigerant supplied from the radiator 20 to the velocity energy in such a manner that the refrigerant is isentropically depressurized and is expanded by the nozzle arrangement 41. In the mixer arrangement 42, high velocity refrigerant flow discharged from the nozzle arrangement 41 draws the vapor phase refrigerant, which has been vaporized in the evaporator 30, and is mixed with the vapor phase refrigerant. In the diffuser arrangement 43, the refrigerant discharged from the nozzle arrangement 41 and the refrigerant drawn from the evaporator 30 are further mixed in such a manner that the velocity energy of the refrigerant is converted into the pressure energy to increase the pressure of the mixed refrigerant discharged from the diffuser arrangement 43.

In the mixer arrangement 42, the refrigerants are mixed in such a manner that the sum of the kinetic momentum of the refrigerant discharged from the nozzle arrangement 41 and the kinetic momentum of the refrigerant drawn into the ejector 40 from the evaporator 30 is conserved. Thus, even in the mixer arrangement 42, the static pressure of the refrigerant is increased.

In the diffuser arrangement 43, a passage cross sectional size is linearly increased toward the downstream end of the diffuser arrangement 43 to convert the dynamic pressure of the refrigerant to the corresponding static pressure. Thus, in the ejector 40, the refrigerant pressure is increased through both the mixer arrangement 42 and the diffuser arrangement 43. Therefore, the mixer arrangement 42 and the diffuser arrangement 43 are collectively referred to as a pressurizer arrangement 47, which has a refrigerant passage 47a.

The nozzle arrangement 41 has a multi-tube nozzle arrangement that includes a plurality of tubular walls (in the present embodiment, the number of the tubular walls is two) 101, 102, which are concentrically arranged. The tubular walls 101, 102 define a plurality of concentric nozzle passage parts (in the present embodiment, the number of the concentric nozzle passage parts is two) 41a, 41b, which are concentrically arranged. One of the nozzle passage parts 41a, 41b of the nozzle arrangement 41, which is located radially inward, is referred to as an inner nozzle passage part 41a. The other one of the nozzle passage parts 41a, 41b of the nozzle arrangement 41 is referred to as an outer nozzle passage part 41b. A valve 44, which controls refrigerant flow, is arranged on an upstream side of the outer nozzle passage part 41b.

Furthermore, the pressurizer arrangement 47, i.e., each of the mixer arrangement 42 and the diffuser arrangement 43 has a multi-tube structure (double cylindrical tube structure) that includes a plurality of tubular walls (in the present embodiment, the number of the tubular walls is two) 100, 103, which are concentrically arranged. The tubular walls 100, 103 define inner and outer pressurizer passage parts of the pressurizer arrangement 47, which are concentrically arranged. Furthermore, the outer tubular wall 100, which is located radially outward of the inner tubular wall 103, serves as an outer tubular wall of the ejector 40.

More specifically, in the mixer arrangement 42, inner and outer mixer passage parts 42a, 42b are defined by the tubular walls 100, 103. Also, in the diffuser arrangement 43, inner and outer diffuser passage parts 43a, 43b are defined by the tubular walls 100, 103. The inner mixer passage part 42a and the inner diffuser passage part 43a form the inner pressurizer passage part of the pressurizer arrangement 47. The outer mixer passage part 42b and the outer diffuser passage part 43b form the outer pressurizer passage part of the pressurizer 47.

The nozzle arrangement 41 and the pressurizer arrangement 47 are concentrically or coaxially arranged in the following manner. That is, the center of the cross section of a refrigerant outlet of the nozzle arrangement 41 (i.e., each of the center of the cross section of a refrigerant outlet of the inner nozzle passage part 41a and the center of the cross section of a refrigerant outlet of the outer nozzle passage part 41b) generally coincides with the center of the cross section of a refrigerant inlet of the pressurizer arrangement 47 (i.e., each of the center of the cross section of a refrigerant inlet of the inner mixer passage part 42a and the center of the cross section of a refrigerant inlet of the outer mixer passage part 42b).

In the present embodiment, a Laval nozzle, which has a throttled portion in its passage, is used to increase the velocity of the refrigerant, which is discharged from the nozzle passage parts 41a, 41b, to a level equal to or greater than the sonic velocity. As an alternative to the Laval nozzle, an appropriate tapered nozzle (e.g., a plug nozzle) or an appropriate straight tubular nozzle (e.g., a capillary nozzle) may be used.

Figure 3:
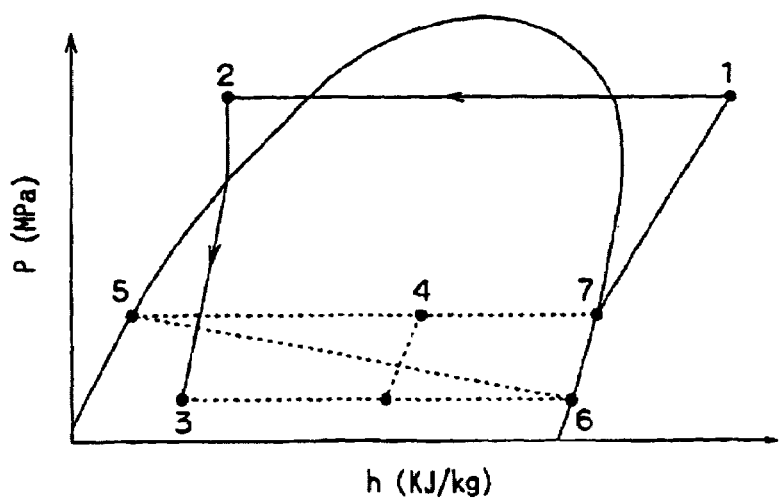
FIG. 3 is a pressure-enthalpy (p-h) diagram showing relationship between pressure and enthalpy in the ejector cycle of the first embodiment.

FIG. 3 is a pressure-enthalpy (p-h) diagram showing macroscopic operation of the ejector cycle. The macroscopic operation of the ejector cycle of the present embodiment is substantially the same as that of the known ejector cycle. Thus, in the present embodiment, the macroscopic operation of the ejector cycle will not be discussed for the sake of simplicity. Furthermore, in FIG. 3, points indicated by numerals 1–7 correspond to points indicated by numerals 1–7 in FIG. 1 and show corresponding states of the refrigerant at these points 1–7.

Operation and advantages of the present embodiment will be described.

Figure 4A:
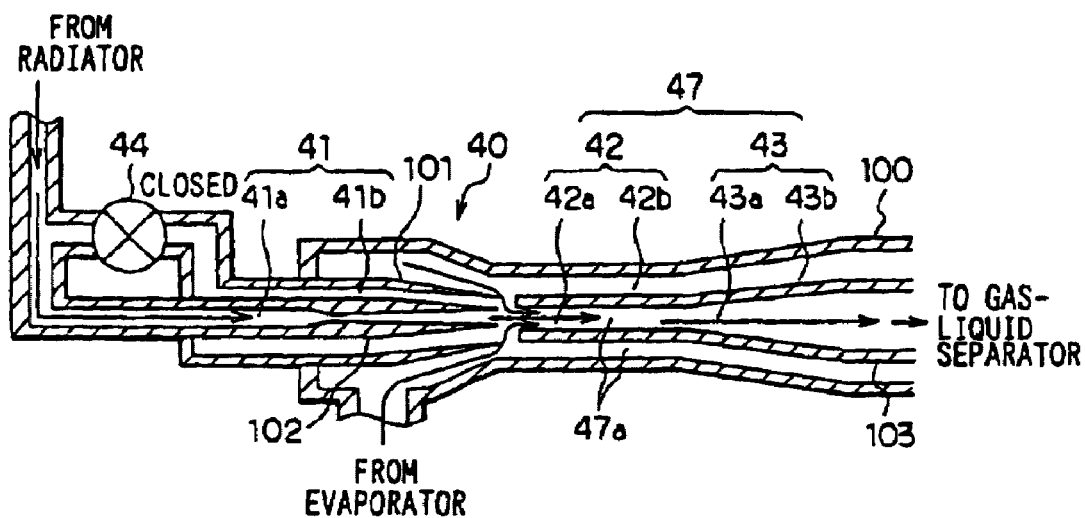
FIG. 4A is a schematic view showing one operational state of the ejector according to the first embodiment.
Figure 4B:
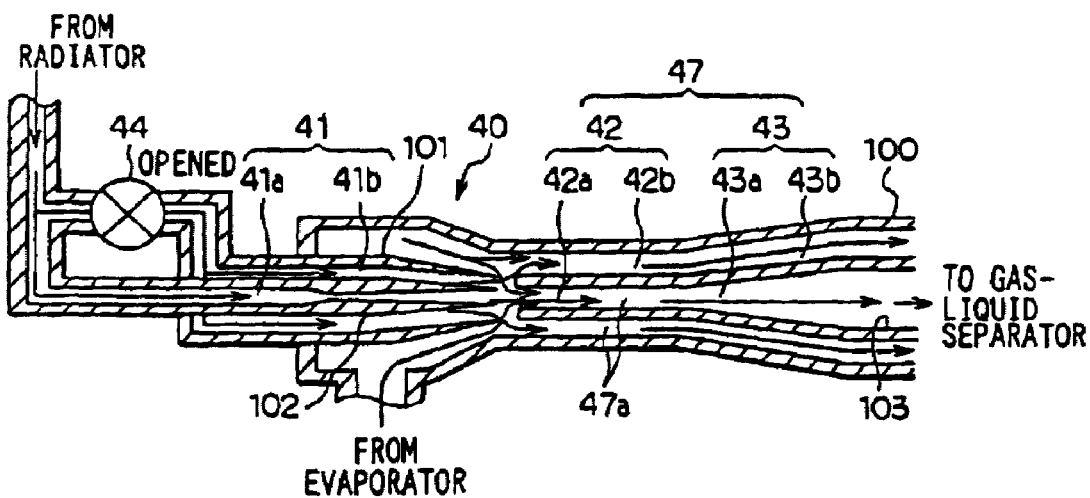
FIG. 4B is a schematic view showing another operational state of the ejector according to the first embodiment.

With reference to FIG. 4A, when the rotational speed of the compressor 10 becomes less than a predetermined rotational speed, and thus the refrigerant flow rate of refrigerant supplied to the ejector 40 becomes less than a predetermined flow rate, the valve 44 is closed, so that the refrigerant is supplied only to the inner nozzle passage part 41a. With reference to FIG. 4B, on the other hand, when the rotational speed of the compressor 10 becomes equal to or greater than the predetermined rotational speed, and thus the refrigerant flow rate of the refrigerant supplied to the ejector 40 becomes equal to or greater than the predetermined flow rate, the valve 44 is opened, so that the refrigerant is supplied both to the inner nozzle passage part 41a and the outer nozzle passage part 41b.

In this way, when the refrigerant flow rate is relatively low, the refrigerant discharged from the inner nozzle component 41a is mainly supplied to the inner mixer passage part 42a, as shown in FIG. 4A, thereby providing a smaller cross sectional size of a variable refrigerant passing zone of the refrigerant passage 47a of the pressurizer arrangement 47. Thus, the refrigerant discharged from the inner nozzle passage part 41a draws the refrigerant vaporized in the evaporator 30 and is supplied to the inner mixer passage part 42a and to the inner diffuser passage part 43a along with the refrigerant vaporized in the evaporator 30, so that the pressure of the mixed refrigerant discharged from the inner diffuser passage part 43a is increased. Thereafter, the mixed refrigerant is supplied to the gas-liquid separator 50.

With reference to FIG. 4B, when the refrigerant flow rate is relatively large, the refrigerant discharged from the inner and outer nozzle passage parts 41a, 41b is supplied to the inner and outer mixer passage parts 42a, 42b, thereby providing a larger cross sectional size of the variable refrigerant passing zone of the refrigerant passage 47a of the pressurizer arrangement 47. Thus, the refrigerant discharged from the inner and outer nozzle passage parts 41a, 41b draws the refrigerant vaporized in the evaporator 30 and is supplied to the inner and outer mixer passage parts 42a, 42b and to the inner and outer diffuser passage parts 43a, 43b along with the refrigerant vaporized in the evaporator 30, so that the pressure of the mixed refrigerant discharged from the inner and outer diffuser passage parts 43a, 43b is increased. Thereafter, the mixed refrigerant is supplied to the gas-liquid separator 50.

Since a cross section of the outlet of the outer nozzle passage part 41b is annular, the refrigerant discharged from the outer nozzle passage part 41b forms annular refrigerant flow. The annular refrigerant flow of the outer nozzle passage part 41b provides the greater contact surface area for contacting with the vapor phase refrigerant flow, which is vaporized in the evaporator 30, in comparison to that of the cylindrical refrigerant flow of the inner nozzle passage part 41a. Thus, the entraining force (i.e., drawing force) of the annular refrigerant flow of the outer nozzle passage part 41b for drawing the vapor phase refrigerant is increased. As a result, the sufficient entraining force, which corresponds to the increased refrigerant flow rate, can be provided.

As discussed above, in the present embodiment, the cross sectional size of the variable refrigerant passing zone of the refrigerant passage 47a, through which the refrigerant from the nozzle arrangement 41 and the refrigerant from the evaporator 30 mainly pass during operation of the ejector 40, can be substantially varied depending on the refrigerant flow rate or the heat load. Thus, the relatively high ejector efficiency can be maintained regardless of the refrigerant flow rate in the pressurizer arrangement 47.

In the present embodiment, the tubular walls 100–103 and the valve 44 serve as a refrigerant passing zone varying means for varying the cross sectional size of the variable refrigerant passing zone of the refrigerant passage 47a of the pressurizer arrangement 47.

(Second Embodiment)

Figure 5:
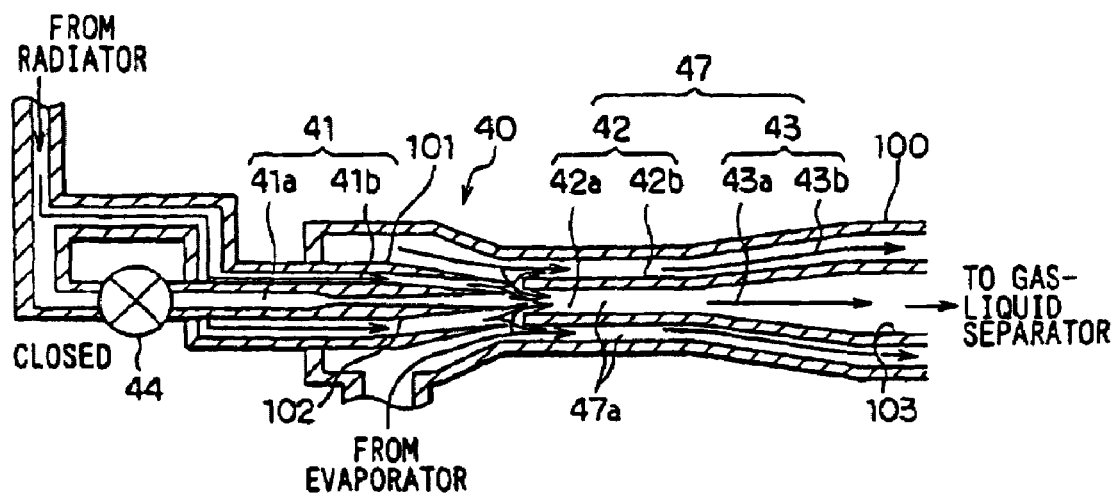
FIG. 5 is a schematic view showing an ejector according to a second embodiment of the present invention.

In the first embodiment, the valve 44 is arranged on the upstream side of the outer nozzle passage part 41b. Alternatively, in a second embodiment of the present invention, the valve 44 is arranged on an upstream side of the inner nozzle passage part 41a, as shown in FIG. 5. Control operation of the valve 44 is the same as that of the first embodiment and will not be described for the sake of simplicity.

With this arrangement, in the present embodiment, the refrigerant discharged from the nozzle arrangement 41 always has the annular refrigerant flow. Thus, the refrigerant flow discharged from the nozzle arrangement 41 always has the relatively large contact surface area to maintain relatively large drawing force of the ejector 40 for drawing the vaporized refrigerant from the evaporator 30. Furthermore, it should be noted that the valve 44 can be arranged on the upstream side of each of the outer nozzle passage part 41b and the inner nozzle passage part 41a if desired.

(Third Embodiment)

Figure 6A:
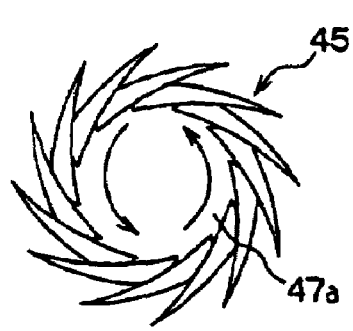
FIG. 6A is a schematic view showing one operational state of an ejector according to a third embodiment of the present invention.
Figure 6B:
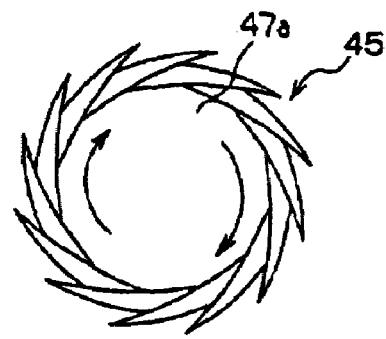
FIG. 6B is a schematic view showing another operational state of the ejector according to the third embodiment.

In a third embodiment of the present invention, the pressurizer arrangement 47 (i.e., the mixer arrangement 42 and the diffuser arrangement 43) is formed as a single tubular body. Furthermore, as shown in FIGS. 6A and 6B, the pressurizer arrangement 47 (i.e., the mixer arrangement 42 and the diffuser arrangement 43) has a variable mechanism (variable iris diaphragm means) 45, which is similar to a shutter (iris diaphragm) of a camera and is capable of varying an aperture size, i.e., a passage cross sectional size of the refrigerant passage (more specifically, the variable refrigerant passing zone of the refrigerant passage) 47a. FIG. 6A shows a state where the refrigerant flow rate is relatively small, and thus the aperture size of the variable mechanism 45 is reduced. FIG. 6B shows a state where the refrigerant flow rate is relatively large, and thus the aperture size of the variable mechanism 45 is increased.

In this way, without providing the multi-tube arrangement in the pressurizer arrangement 47 (i.e., the mixer arrangement 42 and the diffuser arrangement 43), the relatively high ejector efficiency can be maintained regardless of the refrigerant flow rate in the pressurizer arrangement 47.

In the present embodiment, the variable mechanism 45 serves as the refrigerant passing zone varying means.

(Fourth Embodiment)

Figure 7A:
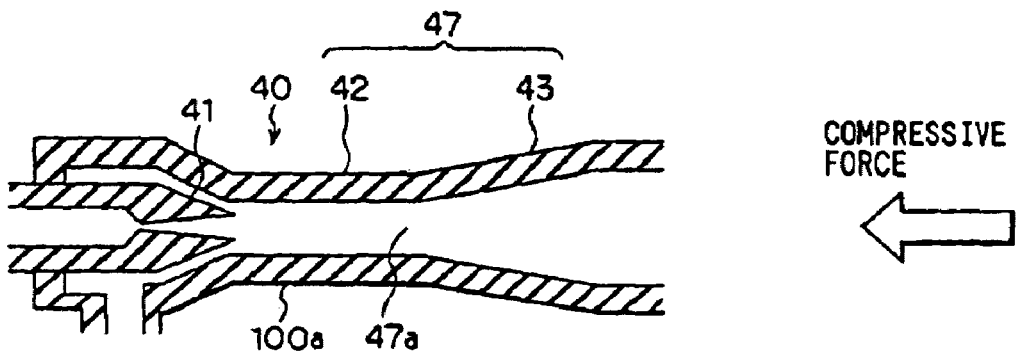
FIG. 7A is a schematic view showing one operational state of an ejector according to a fourth embodiment of the present invention.
Figure 7B:
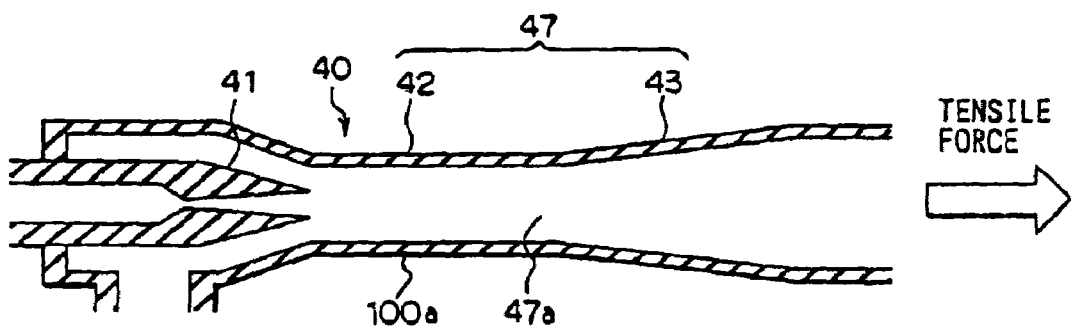
FIG. 7B is a schematic view showing another operational state of the ejector according to the fourth embodiment.

In a fourth embodiment of the present invention, as shown in FIGS. 7A and 7B, an outer tubular wall 100a of the pressurizer arrangement 47 (i.e., the mixer arrangement 42 and the diffuser arrangement 43) is made of an elastically deformable material, such as a rubber material. The outer tubular wall 100a of the pressurizer arrangement 47 is axially compressed or pulled by an actuator (not shown), which applies compressive force or tensile force to the outer tubular wall 100a of the pressurizer 47.

More specifically, when the refrigerant flow rate is relatively small, the outer tubular wall 100a of the pressurizer arrangement 47 is axially compressed by the actuator, as shown in FIG. 7A, so that the passage cross sectional size of the refrigerant passage (more specifically, the variable refrigerant passing zone of the refrigerant passage) 47a is reduced. On the other hand, when the refrigerant flow rate is relatively large, the outer tubular wall 100a of the pressurizer arrangement 47 is axially pulled by the actuator, as shown in FIG. 7B, so that the passage cross sectional size of the refrigerant passage (more specifically, the variable refrigerant passing zone of the refrigerant passage) 47a is increased.

In this way, without providing the multi-tube arrangement in the pressurizer arrangement 47 (i.e., the mixer arrangement 42 and the diffuser arrangement 43), the relatively high ejector efficiency can be maintained regardless of the refrigerant flow rate in the pressurizer arrangement 47.

In the present embodiment, the outer tubular wall 100a of the pressurizer arrangement 47 also serves as the outer tubular wall of the ejector 40 and further serves as the refrigerant passing zone varying means.

(Fifth Embodiment)

Figure 8:
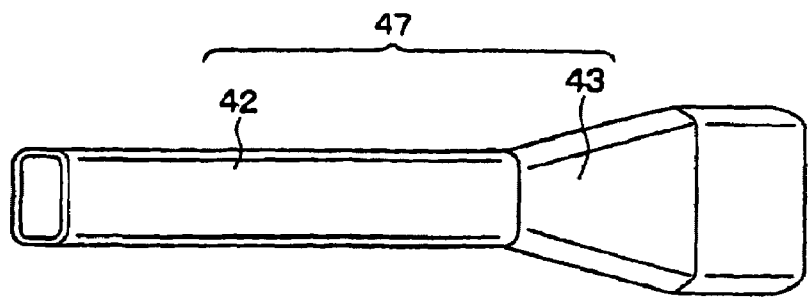
FIG. 8 is a schematic view showing an ejector according to a fifth embodiment of the present invention.
Figure 9:
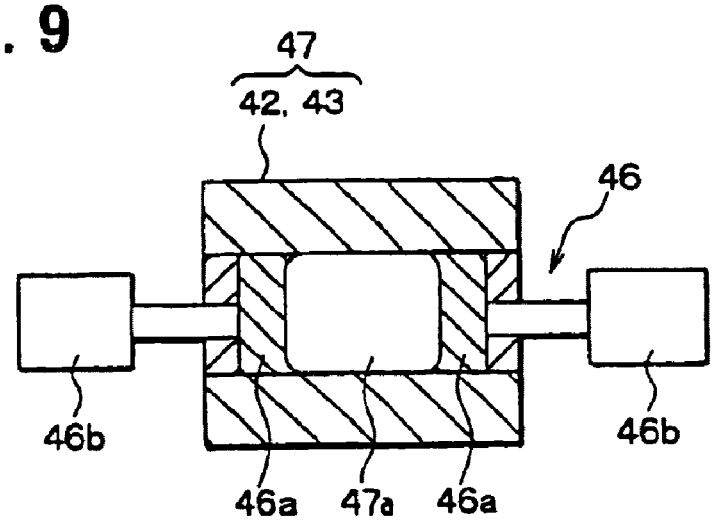
FIG. 9 is a schematic view showing the ejector according the fifth embodiment.

In a fifth embodiment of the present invention, as shown in FIG. 8, a cross section of the refrigerant passage of the pressurizer arrangement 47 (i.e., the mixer arrangement 42 and the diffuser arrangement 43) has a generally rectangular shape. Furthermore, as shown in FIG. 9, a variable mechanism 46 is provided in the pressurizer arrangement 47. The variable mechanism 46 varies the cross sectional size of the refrigerant passage (more specifically, the variable refrigerant passing zone of the refrigerant passage) 47a of the pressurizer arrangement 47 in a direction perpendicular to the flow direction of the refrigerant, i.e., in a direction perpendicular to the axial direction of the pressurizer arrangement 47.

Among flat wall elements of the pressurizer arrangement 47, which define the refrigerant passage 47a of the pressurizer arrangement 47, two opposed flat wall elements 46a, each of which has a generally flat inner surface, are movable in the direction perpendicular to the flow direction of the refrigerant. The variable mechanism 46 includes two actuators 46b, each of which moves a corresponding one of the flat wall elements 46a. Each actuator 46b can be of any type, such as an electric actuator, which uses electric magnetic force or piezoelectric effect. Alternatively, each actuator 46 can be a mechanical actuator, which has a diaphragm provided with inert gas, such as nitrogen gas, filled at a back side of the diaphragm.

Figure 10A:
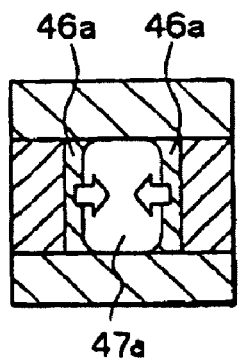
FIG. 10A is a schematic view showing one operational state of the ejector of the fifth embodiment.
Figure 10B:
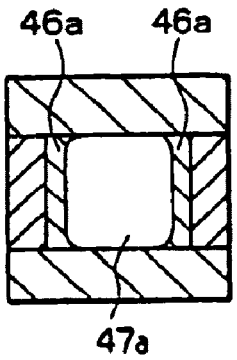
FIG. 10B is a schematic view showing another operational state of the ejector of the fifth embodiment.
Figure 10C:
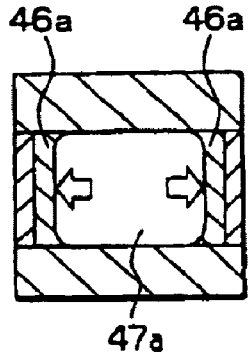
FIG. 10C is a schematic view showing a further operational state of the ejector of the fifth embodiment.

Furthermore, the flat wall elements 46a are moved in the manner shown in FIGS. 10A–10C. That is, as shown in FIG. 10C, when the refrigerant flow rate is relatively large, for example, during relatively high load operation, the flat wall elements 46a are moved outward from, for example, the position shown in FIG. 10B to increase the passage cross sectional size of the refrigerant passage (more specifically, the variable refrigerant passing zone of the refrigerant passage) 47a. On the other hand, as shown in FIG. 10A, when the refrigerant flow rate is relatively small, for example, during relatively low load operation, the flat wall elements 46a are moved inward from, for example, the position shown in FIG. 10B to decrease the passage cross sectional size of the refrigerant passage (more specifically, the variable refrigerant passing zone of the refrigerant passage) 47a.

In this way, without providing the multi-tube arrangement in the pressurizer arrangement 47 (i.e., the mixer arrangement 42 and the diffuser arrangement 43), the relatively high ejector efficiency can be maintained regardless of the refrigerant flow rate in the pressurizer arrangement 47.

Furthermore, in the present embodiment, among the flat wall elements of the pressurizer arrangement 47, which define the refrigerant passage 47a of the pressurizer arrangement 47, the two opposed flat wall elements 46a are moved, as described above. Thus, the center of the cross section of the refrigerant passage 47a of the pressurizer 47 does not substantially change even when the wall elements 46a are moved. As a result, the energy loss in the pressurizer arrangement 47 can be restrained, and thus the relatively high ejector efficiency can be maintained.

In the present embodiment, the variable mechanism 46 serves as the refrigerant passing zone varying means.

(Sixth Embodiment)

Figure 11A:
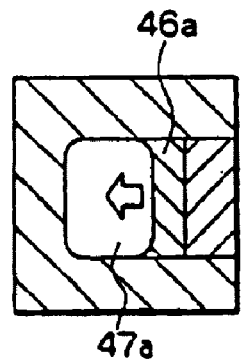
FIG. 11A is a schematic view showing one operational state of an ejector according to a sixth embodiment.

In the fifth embodiment, the two opposed flat wall elements 46a are both moved. In a sixth embodiment, as shown in FIGS. 11A–11C, only one of the wall elements 46a discussed in the fifth embodiment is made movable according to the refrigerant flow rate.

Figure 11B:
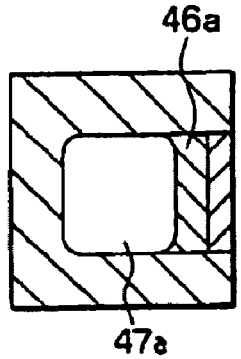
FIG. 11B is a schematic view showing another operational state of the ejector of the sixth embodiment.
Figure 11C:
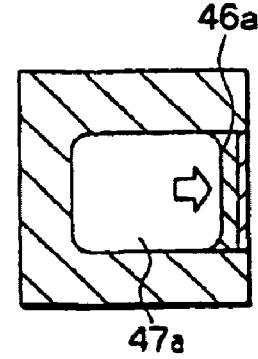
FIG. 11C is a schematic view showing a further operational state of the ejector of the sixth embodiment.

That is, as shown in FIG. 11C, when the refrigerant flow rate is relatively large, for example, during the relatively high load operation, the flat wall element 46a is moved outward from, for example, the position shown in FIG. 11B to increase the passage cross sectional size of the refrigerant passage (more specifically, the variable refrigerant passing zone of the refrigerant passage) 47a. On the other hand, as shown in FIG. 11A, when the refrigerant flow rate is relatively small, for example, during relatively low load operation, the flat wall element 46a is moved inward from, for example, the position shown in FIG. 11B to decrease the passage cross sectional size of the refrigerant passage (more specifically, the variable refrigerant passing zone of the refrigerant passage) 47a.

(Seventh Embodiment)

In the fifth and sixth embodiments, the cross section of the refrigerant passage of the pressurizer arrangement 47 (i.e., the mixer arrangement 42 and the diffuser arrangement 43) has the generally rectangular shape. In a seventh embodiment of the present invention, as shown in FIG. 12, the cross section of the refrigerant passage 47a of the pressurizer arrangement 47 (i.e., the mixer arrangement 42 and the diffuser arrangement 43) has a generally ellipsoidal shape. Similar to the fifth embodiment, two curved wall elements 46c, each of which has a curved inner surface to partially define the refrigerant passage 47a of the pressurizer arrangement 47, are moved by corresponding actuators 46b.

The curved wall elements 46c are moved in the manner shown in FIGS. 13A–13C. That is, as shown in FIG. 13C, when the refrigerant flow rate is relatively large, for example, during relatively high load operation, the curved wall elements 46c are moved outward from, for example, the position shown in FIG. 13B to increase the passage cross sectional size of the refrigerant passage (more specifically, the variable refrigerant passing zone of the refrigerant passage) 47a. On the other hand, as shown in FIG. 13A, when the refrigerant flow rate is relatively small, for example, during relatively low load operation, the curved wall elements 46c are moved inward from, for example, the position shown in FIG. 13B to decrease the passage cross sectional size of the refrigerant passage (more specifically, the variable refrigerant passing zone of the refrigerant passage) 47a.

In this way, the advantages similar to those discussed with reference to the fifth embodiment can be achieved. Furthermore, since the cross section of the refrigerant passage (more specifically, the variable refrigerant passing zone of the refrigerant passage) 47a of the pressurizer arrangement 47 has the generally ellipsoidal shape, energy loss induced by vortexes in the refrigerant passage 47a of the pressurizer arrangement 47 can be reduced in comparison to the case where the cross section of the refrigerant passage has the rectangular shape.

(Eighth Embodiment)

In the seventh embodiment, the two curved wall elements 46c are both moved. In an eighth embodiment of the present invention, as shown in FIGS. 14A–14C, only one of the wall elements 46c discussed in the seventh embodiment is made movable according to the refrigerant flow rate.

That is, as shown in FIG. 14C, when the refrigerant flow rate is relatively large, for example, during the relatively high load operation, the curved wall element 46c is moved outward from, for example, the position shown in FIG. 14B to increase the passage cross sectional size of the refrigerant passage (more specifically, the variable refrigerant passing zone of the refrigerant passage) 47a. On the other hand, as shown in FIG. 14A, when the refrigerant flow rate is relatively small, for example, during relatively low load operation, the curved wall element 46c is moved inward from, for example, the position shown in FIG. 14B to decrease the passage cross sectional size of the refrigerant passage (more specifically, the variable refrigerant passing zone of the refrigerant passage) 47a.

(Ninth Embodiment)

Figure 15:
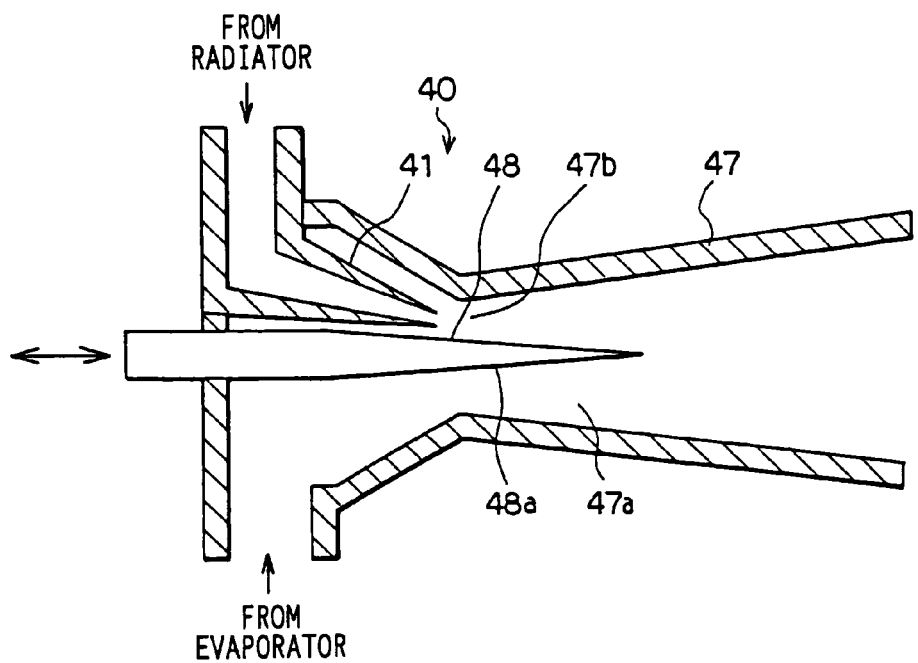
FIG. 15 is a schematic cross sectional view of an ejector according to a ninth embodiment of the present invention.

With reference to FIG. 15, an ejector 40 according to a ninth embodiment of the present invention will be described.

In the ninth embodiment, a tapered cylindrical needle 48, which has a tapered distal end portion 48a, is arranged in the ejector 40 such that the needle 48 is located in the cross sectional center of a pressurizer arrangement 47. The needle 48 is driven, for example, by an electromagnetic drive device (not shown) to move in an axial direction of the pressurizer arrangement 47 (left-right direction in FIG. 15). A nozzle arrangement 41, which converts pressure energy of high pressure refrigerant supplied from the radiator 20 to velocity energy, is arranged adjacent to the needle 48, as shown in FIG. 15. An outlet of the nozzle arrangement 41 is opened toward the pressurizer arrangement 47. When the needle 48 is driven to move into the pressurizer arrangement 47 in the axial direction, the tapered distal end portion 48a is placed in the pressurizer arrangement 47. Since the tapered end portion 48a is tapered, a cross sectional size of the tapered end portion 48a is reduced toward its distal end. As a result, when the tapered end portion 48a is inserted further into the pressurizer arrangement 47, a cross sectional size of a refrigerant passage 47a is further reduced by the tapered end portion 48a. Thus, the needle 48 serves as a refrigerant passing zone varying means for varying the cross sectional size of the refrigerant passage 47a. In the present embodiment, the pressurizer arrangement 47 is constructed such that the cross section of the refrigerant passage 47a is linearly increased from an inlet 47b of the refrigerant passage 47a toward the downstream end of the refrigerant passage 47a. However, the pressurizer arrangement 47 can be constructed such that the refrigerant passage 47a has a constant cross sectional zone similar to that of the mixer arrangement 42 of the pressurizer arrangement 47 in the first embodiment. In the present embodiment, the needle 48 is moved in the flow direction of the refrigerant, so that the drive force for driving the needle 48 is relatively small in comparison to, for example, the drive force required to move the wall element(s) 46a of the fifth embodiment, which is moved in the direction perpendicular to the flow direction of the refrigerant.

(Tenth Embodiment)

Figure 16:
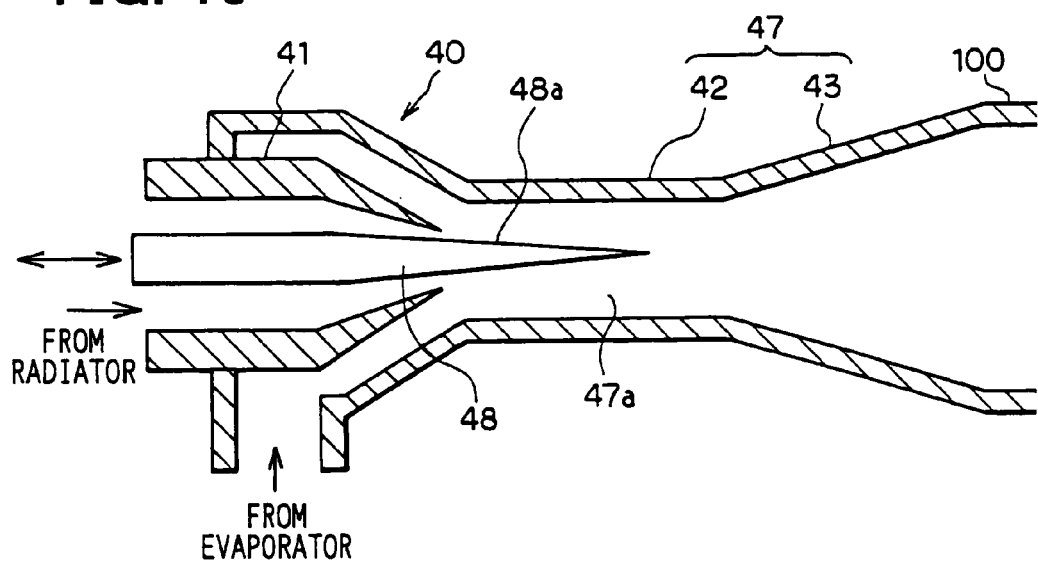
FIG. 16 is a schematic cross sectional view of an ejector according to a tenth embodiment of the present invention.
Figure 17:
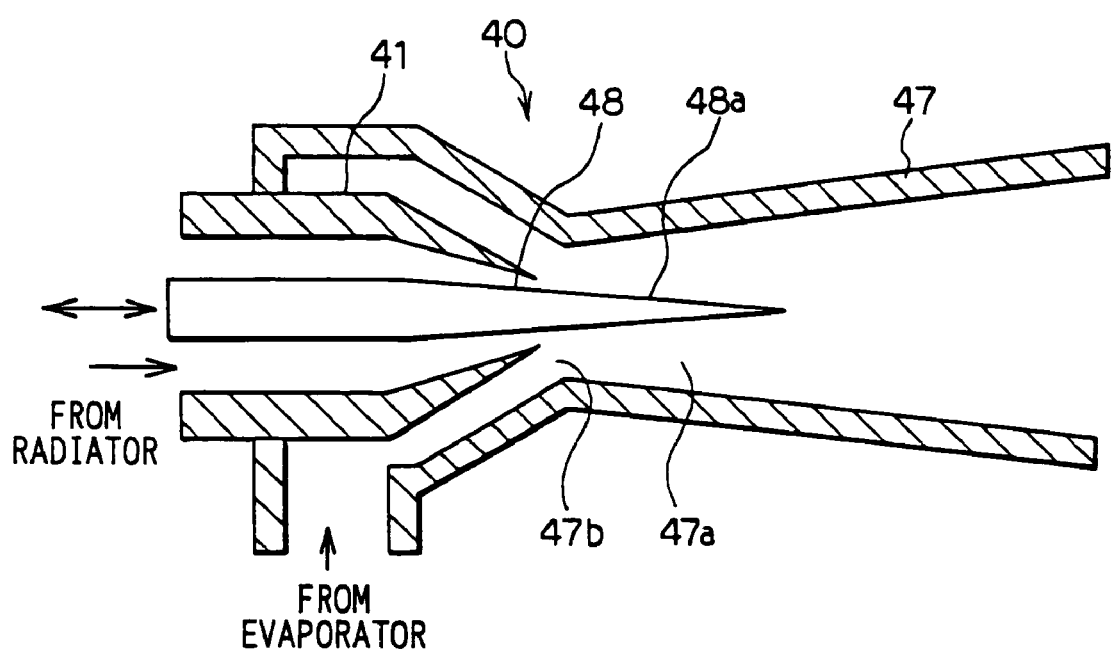
FIG. 17 is a schematic cross sectional view showing a modification of the ejector according to the tenth embodiment of the present invention.

With reference to FIG. 16, an ejector 40 according to a tenth embodiment will be described. In this embodiment, a needle (refrigerant passing zone varying means) 48, which is similar to that of the ninth embodiment, is received in a tubular wall of a nozzle arrangement 41. Similar to the ninth embodiment, the needle 48 is driven, for example, by an electromagnetic drive device (not shown) to move in an axial direction of a pressurizer arrangement 47 (left-right direction in FIG. 16). The pressurizer arrangement 47 has a mixer arrangement 42 and a diffuser arrangement 43. When a tapered distal end portion 48a of the needle 48 is moved relative to the outlet of the nozzle arrangement 41, a cross sectional size of the outlet of the nozzle arrangement 41 is changed. Furthermore, the tapered distal end portion 48a is movable into a refrigerant passage 47a of the pressurizer arrangement 47 to change the cross sectional size of the refrigerant passage 47a in a manner similar to that of the ninth embodiment. The nozzle arrangement 41, the pressurizer arrangement 47 and the needle 48 are coaxially arranged, so that the needle 48 can simultaneously change the cross sectional size of the outlet of the nozzle arrangement 41 and the cross sectional size of the refrigerant passage 47a. The pressurizer arrangement 47 of FIG. 16 has the constant cross sectional zone in the mixer arrangement 42. Alternatively, the pressurizer arrangement 47 can have a linearly increasing cross section, such as one shown in FIG. 17.

OTHER EMBODIMENTS

In the above embodiments, the nozzle arrangement 41 and the pressurizer arrangement 47 are concentrically or coaxially arranged with respect to the straight center line, i.e., the center axis of the ejector 40. The present invention is not limited to this arrangement. For example, the center line of the ejector 40 can be a curved center line, and the nozzle arrangement 41 and the pressurizer arrangement 47 can be concentrically or coaxially arranged with respect to the curved center line.

In the first and second embodiments, the pressurizer arrangement 47 has the double tube structure having the two tubular walls. However, the present invention is not limited to this arrangement. For example, the pressurizer arrangement 47 can have a multi-tube structure having more than two tubular walls.

Furthermore, in the above embodiments, the invention is embodied in the vehicle air conditioning system. However, the present invention is not limited to this arrangement. For example, the present invention is equally applicable to any other suitable ejector cycle of, for example, a showcase, a hot water supply system, a refrigerator, a freezer or a building air condition system.

Furthermore, in the above embodiments, chlorofluorocarbon is used as the refrigerant, so that the pressure of the refrigerant in the high pressure side of the ejector cycle is normally kept equal to or less than the critical pressure of the refrigerant. However, the present invention is not limited to this. For example, carbon dioxide can be used as the refrigerant. In such a case, the pressure of the refrigerant in the high pressure side can be equal to or greater than the critical pressure of the refrigerant.

Additional advantages and modifications will readily occur to those skilled in the art. The invention in its broader terms is therefore not limited to the specific details, representative apparatus, and illustrative examples shown and described.

What is claimed is:

1. An ejector-type depressurizer for a vapor compression refrigeration system, which includes a compressor that compresses refrigerant of a low pressure space of the vapor compression refrigeration system and thereafter discharges the compressed refrigerant to a high pressure space of the vapor compression refrigeration system, wherein the ejector-type depressurizer draws refrigerant from an evaporator of the vapor compression refrigeration system while depressurizing the refrigerant of the high pressure space and thereafter supplying the depressurized refrigerant to the low pressure space, the ejector-type depressurizer comprising:
    a nozzle arrangement that depressurizes and expands the refrigerant of the high pressure space to convert pressure energy of the refrigerant of the high pressure space into velocity energy of a flow of the refrigerant;
    a passage forming member that forms a passage, which receives the nozzle arrangement, wherein the passage forming member includes:
    an introducing passage portion that is formed to extend toward an outlet of the nozzle arrangement, wherein the introducing passage portion introduces the refrigerant supplied from the evaporator to merge the introduced refrigerant with the flow of the refrigerant discharged from the nozzle arrangement; and
    a pressurizing passage portion, which is formed to extend from the outlet of the nozzle arrangement in a refrigerant discharge direction of the nozzle arrangement, wherein the pressurizing passage portion mixes the refrigerant discharged from the nozzle arrangement with the refrigerant introduced through the introducing passage portion to convert the velocity energy of the refrigerant into pressure energy of the refrigerant; and
    a variable passage member that shifts a relative position of an effective outer wall of the nozzle arrangement with respect to a wall which defines the pressurizing passage portion, the nozzle arrangement being located radially inward of the wall, to change a passage cross sectional area of the pressurizing passage portion.

2. The ejector-type depressurizer according to claim 1, wherein the variable passage member includes an adjustable iris diaphragm means for varying the passage cross sectional area of the pressurizing passage portion.

3. The ejector-type depressurizer according to claim 1, wherein the variable passage member includes an elastic tubular wall, which is made of an elastically deformable material and at least partially defines the pressurizing passage portion.

4. The ejector-type depressurizer according to claim 1, wherein the variable passage member includes:
    a plurality of concentric tubular walls, which are concentrically arranged in the nozzle arrangement to define a plurality of concentric nozzle passage parts;
    a plurality of concentric tubular walls, which are concentrically arranged in the pressurizing passage portion to define a plurality of concentric pressurizing passage parts, wherein a center of a cross section of each nozzle passage part at an outlet of the nozzle passage part substantially coincides with a center of a cross section of each pressurizing passage part at an inlet of the pressurizing passage part; and
    at least one valve, which controls at least a part of flow of the refrigerant supplied to at least one of the plurality of nozzle passage parts.

5. The ejector-type depressurizer according to claim 1, wherein the variable passage member includes a variable mechanism, which varies the passage cross sectional area of the pressurizing passage portion.

6. The ejector-type depressurizer according to claim 5, wherein a cross section of the pressurizing passage portion has one of an ellipsoidal shape and a rectangular shape.

7. The ejector-type depressurizer according to claim 6, wherein:
    the cross section of the pressurizing passage portion has the ellipsoidal shape; and
    the variable mechanism includes at least one movable curved wall element and at least one actuator, wherein each of the at least one movable curved wall element has a curved inner surface and is moved by a corresponding one of the at least one actuator in a direction generally perpendicular to an axial direction of the refrigerant passage of the pressurizer arrangement.

8. The ejector-type depressurizer according to claim 7, wherein:
    the at least one movable curved wall element includes two movable curved wall elements, which are opposed to each other; and
    the at least one actuator includes two actuators.

9. The ejector-type depressurizer according to claim 6, wherein:
    the passage cross sectional area of the pressurizing passage portion has the rectangular shape; and
    the variable mechanism includes at least one movable flat wall element and at least one actuator, wherein each of the at least one movable flat wall element has a generally flat inner surface and is moved by a corresponding one of the at least one actuator in a direction generally perpendicular to an axial direction of the pressurizing passage portion.

10. The ejector-type depressurizer according to claim 9, wherein:
   the at least one movable flat wall element includes two movable flat wall elements, which are opposed to each other; and
   the at least one actuator includes two actuators.

11. The ejector-type depressurizer according to claim 1, wherein the variable passage member shifts a radially outer edge of an opening end of the nozzle arrangement in a radial direction.

12. The ejector-type depressurizer according to claim 11, wherein:
   the variable passage member includes:
      a plurality of nozzles that are coaxial with one another and include an inner nozzle and an outer nozzle; and
      a selectable passage member, which selectively supplies high pressure refrigerant to one or more of the plurality of nozzles;
   the passage forming member includes a plurality of walls, which are coaxial with one another and form first and second pressurizing passages to constitute the pressurizing passage portion;
   the first pressurizing passage has a relatively small passage cross sectional area, and the second pressurizing passage is arranged radially outward of the first pressurizing passage in a coaxial manner with respect to the first pressurizing passage and has a passage cross sectional area, which is larger than that of the first pressurizing passage;
   the first pressurizing passage is arranged in such a manner that the first pressurizing passage is functional at time of supplying high pressure refrigerant solely to the inner nozzle;
   the second pressurizing passage is arranged in such a manner that the second pressurizing passage is non-functional at the time of supplying the high pressure refrigerant solely to the inner nozzle and is functional at time of supplying the high pressure refrigerant to the outer nozzle.

13. The ejector-type depressurizer according to claim 11, wherein the variable passage member shifts the radially outer edge of the opening end of the nozzle arrangement between a small size and a large size, wherein the large size is larger than the small size.

14. The ejector-type depressurizer according to claim 11, wherein the variable passage member includes a movable wall member, which defines the pressurizing passage portion and is shiftable in a radial direction.

15. The ejector-type depressurizer according to claim 14, wherein the movable wall member is implemented by an adjustable iris.

16. The ejector-type depressurizer according to claim 14, wherein the movable wall member is implemented by an elastic tubular wall.

17. The ejector-type depressurizer according to claim 16, wherein the movable wall member is a member, which is expandable in the radial direction and is extendable in the radial direction.

18. The ejector-type depressurizer according to claim 14, wherein the movable wall member includes two opposed wall portions, which are opposed to each other and define the pressurizing passage portion.

19. The ejector-type depressurizer according to claim 18, wherein each of the two opposed wall portions includes a curved inner surface.

* * * * *